No. 851,721. PATENTED APR. 30, 1907.
O. WITT.
SHEARS.
APPLICATION FILED APR. 16, 1906.
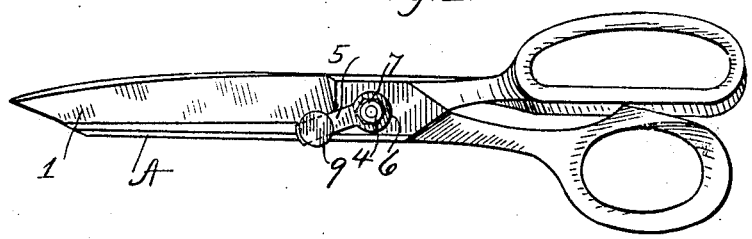
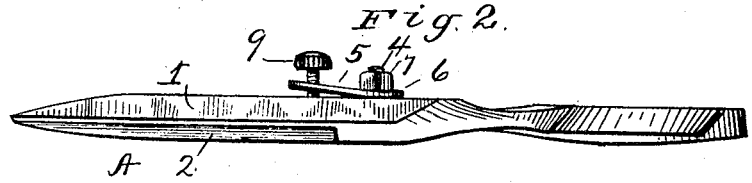
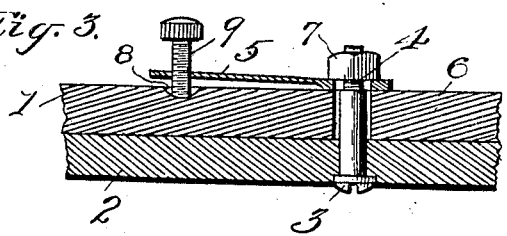
Witnesses
W. Rice Edelen.
John S. Towers
Inventor
Otto Witt
By Shepherd & Parker
Attorneys

UNITED STATES PATENT OFFICE.

OTTO WITT, OF MACON, MISSOURI.

SHEARS.

No. 851,721.　　　　Specification of Letters Patent.　　　　Patented April 30, 1907.

Application filed April 16, 1906. Serial No. 312,008.

*To all whom it may concern:*

Be it known that I, OTTO WITT, a citizen of the United States, residing at Macon, in the county of Macon and State of Missouri, have invented certain new and useful Improvements in Shears, of which the following is a specification.

This invention relates to new and useful improvements in scissors and shears and more particularly to that type in which an adjustable tensioning device is employed to regulate the blades in their confronting relation and to compensate for wear upon the pivot pin in order to insure of uniform cutting at all times.

The detailed construction will appear in the course of the following description, reference being had to the accompanying drawings forming a part of this specification like numerals designating like parts throughout the several views, wherein, Figure 1 is a plan view illustrating a pair of shears constructed in accordance with my invention. Fig. 2 is a side elevation, and Fig. 3 is a longitudinal section on an enlarged scale illustrating the detailed construction and application of a novel form of tensioning device to a pair of shears.

In the practical embodiment of my invention the letter A designates a pair of shears of approved form provided with an upper cutting blade 1 and a lower cutting blade 2. The blades 1 and 2 are united in pivotal connection by a bolt 3 extending therethrough and formed with a reduced threaded end 4. The blades of the shears are tensioned with relation to one another by a spring plate 5 which is formed at one end with an annular enlarged head 6 provided with a central opening for the reception of the reduced end 4 of the bolt 3. The tensioning plate 5 is assembled upon said bolt by a nut 7. Adjacent to the end of the plate 5, the blade 1 is formed with a recess 8 in which bears the end of a set screw 9 threaded through the free end of the plate 5.

In practical use, when it is desired to increase the tension between the blades of the shears, the screw 9 is rotated in the proper direction, thereby raising the free end of the spring plate 5. In this operation the bolt 3 serves as a pivot for the plate 5 which has a slight play thereupon. The rear end or head 6 of the plate 5 bears against the blade 1 and the portion of the plate 5 forwardly of the pivot 3 engages the nut 7 and tightens the bolt 3 in its pivotal connection. The resiliency of the plate 5 is sufficient at all times to force the screw 9 downwardly so that the end thereof will be frictionally retained in the recess 8. The tension of the blades with relation to one another is thus regulated at their point of pivotal connection in order that the adjustment may be positive and as fine as necessary. The tension between the blades is decreased by rotating the screw 9 in an opposite direction.

By regulating the tension of the shears at their point of pivotal connection new advantages are attained not resident in the prior art wherein the tension between the blades has been at a point off center and along the body of the shank. The tension thus established at points along the blades causes said blades to be tightened at their area if "ride" and thus the movement of the shears in the cutter operation is rendered harder owing to the added frictional contact thus established between the blades at their lines of tension. It will be seen from the foregoing description that I have provided a device in which the above objections are eliminated as the tension is exerted centrally at the pivotal point and causes a direct action upon the blades without affecting to a material degree the "ride."

Having fully described my invention I claim:

In a pair of scissors or shears a tensioning device, comprising a resilient plate provided at its end with an enlarged annular head formed with a central opening and loosely surrounding the constricted threaded end of the pivot pin, the plate being held upon said pivot pin by a nut mounted upon said threaded end, said plate extending in a plane at an angle to the adjacent blade of the scissors or shears, and an adjusting set screw carried at the outer end of said plate and being threaded therethrough, the adjacent blade of said scissors or shears being formed with a depression to receive said set screw.

In testimony whereof I affix my signature in presence of two witnesses.

OTTO WITT.

Witnesses:
　　WARREN HOLTZCLAW,
　　J. G. NEWKIRK.